United States Patent [19]

Ostlund

[11] Patent Number: 4,525,275
[45] Date of Patent: Jun. 25, 1985

[54] CONCENTRIC FILTER ELEMENTS

[75] Inventor: Gunnar Ostlund, Mjölby, Sweden

[73] Assignee: Aktiebolaget Svenskt Mjolsocker, Mjolby, Sweden

[21] Appl. No.: 472,769

[22] Filed: Mar. 7, 1983

[30] Foreign Application Priority Data

Mar. 8, 1982 [SE] Sweden ............................ 8201436

[51] Int. Cl.$^3$ .............................................. B01D 29/26
[52] U.S. Cl. ............................ 210/323.2; 210/333.01; 210/334; 210/342; 210/347
[58] Field of Search .............. 210/771, 777, 778, 791, 210/232, 315, 317, 323.1, 323.2, 330, 331, 334, 337, 338, 339, 340, 341, 342, 344, 345, 346, 347, 487, 333.01; 162/198, 199, 200, 273, 274, 276

[56] References Cited

U.S. PATENT DOCUMENTS

| 803,238 | 10/1905 | Lynn | 210/342 |
|---|---|---|---|
| 803,239 | 10/1905 | Lynn | 210/342 |
| 2,522,904 | 10/1950 | Slepicka | 210/342 |
| 2,598,322 | 5/1952 | Vokes | 210/315 |
| 2,854,142 | 9/1958 | Baker | 210/342 |
| 3,349,919 | 10/1967 | Royer et al. | 210/315 |
| 3,980,560 | 9/1976 | Eades | 210/232 |
| 4,265,771 | 5/1981 | Lennartz et al. | 210/791 |
| 4,318,811 | 3/1982 | Ziller | 210/232 |

Primary Examiner—Richard V. Fisher
Assistant Examiner—Wanda L. Millard
Attorney, Agent, or Firm—Larson and Taylor

[57] ABSTRACT

A filter, especially suitable for liquids which are difficult to filter and comprising a closed cylindrical filter container (1) having an inlet (5) for the liquid to be filtered and an outlet (7) for the filtrate and enclosing a filter unit (3) comprising one or more filter elements (13–15) which are mounted substantially concentrically inside the filter container (1). At one end, preferably the bottom end in case of vertically standing containers, the filter container has a bottom cover (2) which can be opened, and the filter element or elements (13–15) are mounted so that they can be extracted from and be retracted to the filter container (1) through said cover (2). The filter unit may comprise several filter elements (13–15) formed as separate units and mounted concentrically inside each other. The filter elements are designed so that an inner filter element over a collar (16–18) carries and is sealed against the adjacent outer filter element. Each filter element comprises an annular cylinder chamber, in which the filtrate is collected and can be removed through draining tubes to an upper collection chamber (45) from which the filtrate is removed from the container.

7 Claims, 7 Drawing Figures

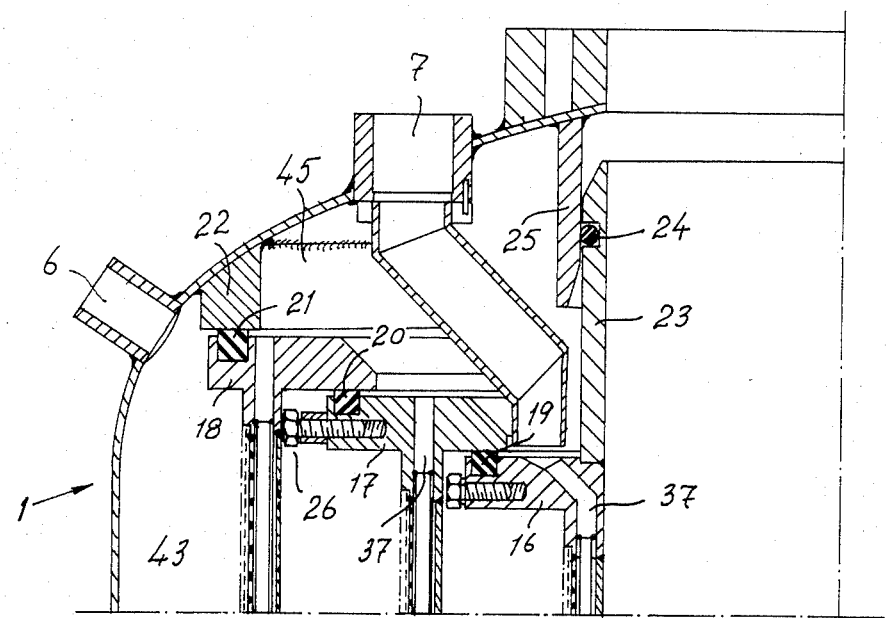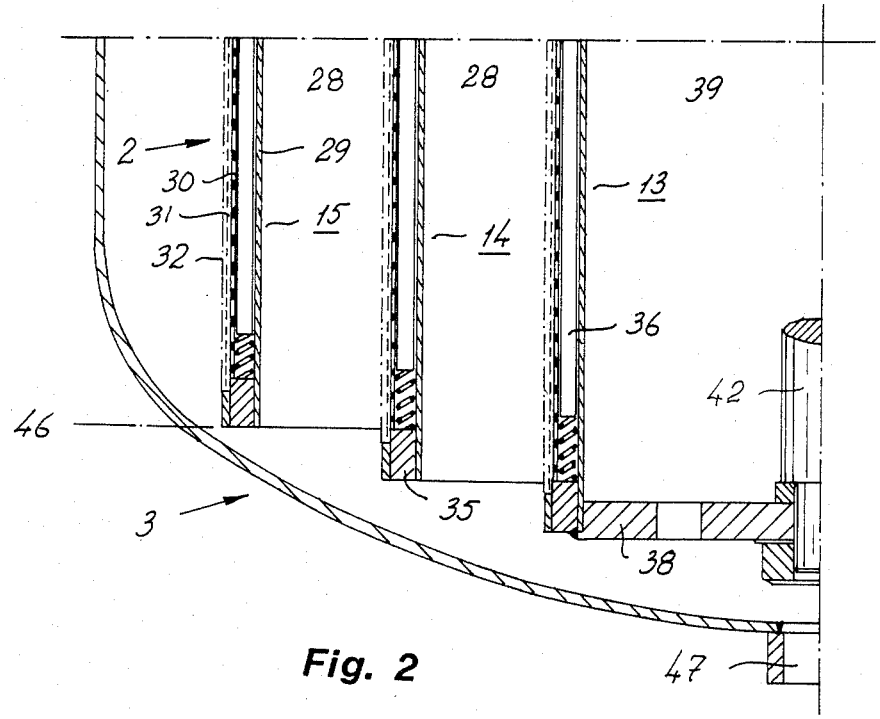
Fig. 2

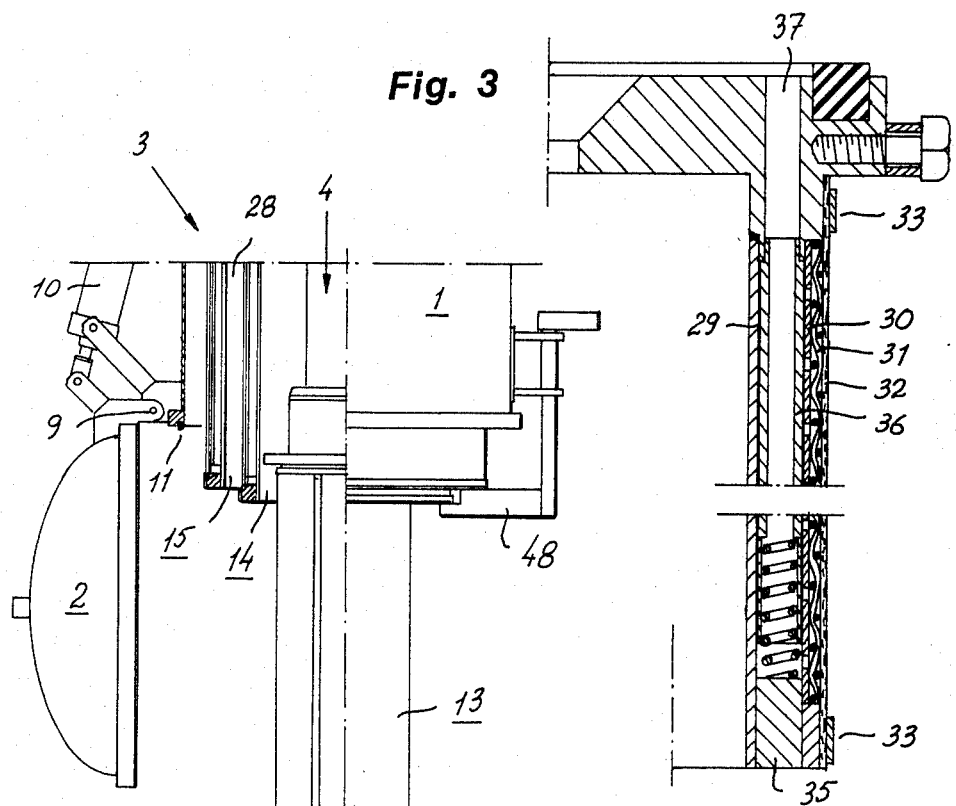
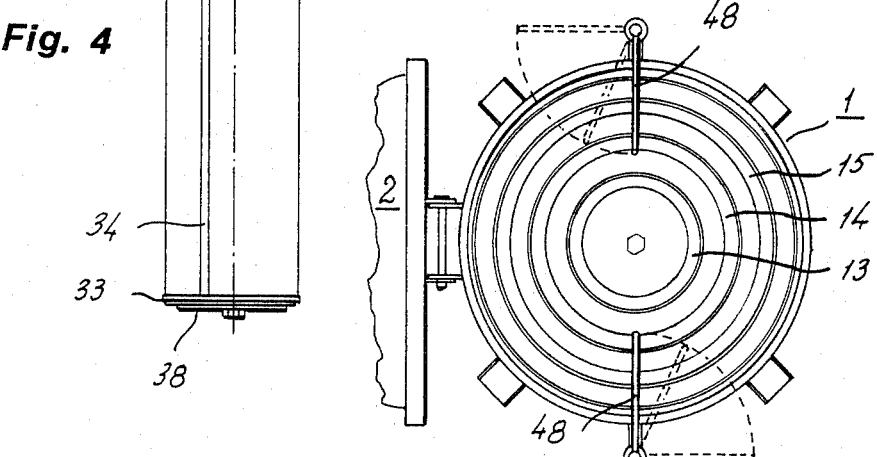
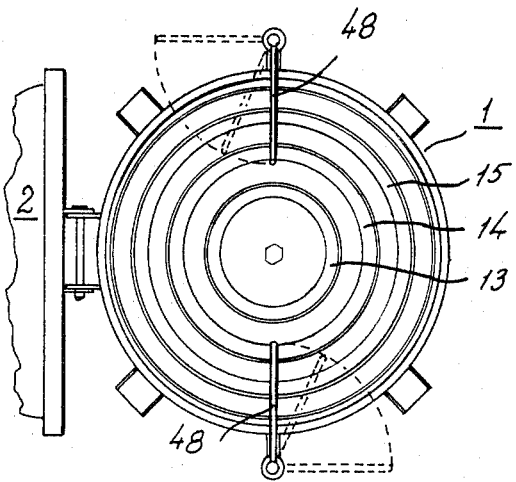

CONCENTRIC FILTER ELEMENTS

The present invention relates to an apparatus for filtering liquids, especially liquids which are difficult to filter. The apparatus comprises a closed cylindrical container which encloses a filter unit and which has an inlet for the liquid to be filtered and an outlet for the filtrate.

Generally, when filtering liquids it is wanted to obtain a high degree of cleaning at the same time as the filter has a high filtering capacity, allowing for long running periods, and a simple and quick cleaning of the filter, therefore the filter has a little so called rest volume, i.e. a little volume of liquid to be filtered which remains un-filtered in the filter container when the filtering is stopped. This allows a simple, quick and cheap reconditioning of the filter units, and a little total volume which occupies a little floor area.

Most of the filters known today are disadvantageous in not fulfilling one or more of the above strong demands of a good filter.

Several previously known filters comprise a closed container in which one or more filter units are mounted, and in which the liquid to be filtered is forced through the filter elements.

One previously known apparatus comprises a large number of small filter tubes which are mounted inside the filter container and in which the liquid to be filtered is supplied to the container, is pressed through the filter tubes and is drained through a collection chamber for all filter tubes. Since a thick filter cake is built up on the outside of the filter tubes the said tubes have to be mounted on a predetermined smallest distance from the adjacent tubes. This type of filter is disadvantageous in that the filter cake has to be removed as a slurry which may among other things cause environment problems when the slurry, is let out in the nature together with the draining water. Further it is a rather heavy work to inspect and exchange the filter elements in this type of filter. In addition thereto the filter elements are relatively expensive to manufacture.

A similar previously known type of filter comprises several filter plates which are mounted in a cylindrical container. Such a filter has a rather high filtering capacity depending on the rather large surface of the filter plates. However, also this type of filter must be dismounted to a large extent when the filter surfaces are to be cleaned. The apparatus is relatively complicated and difficult to handle since the filter plates are of different heights depending on the special location of each specific plate in the cylindrical filter container. Generally this type of filter is mounted in a lying position and in such case occupies a large floor area (type KELLY).

For the purpose of facilitating the cleaning of the filter elements a filter has been constructed which comprises several disc like filter elements which are mounted vertically over each other in the closed filter container. The liquid to be filtered is supplied to the container and is pressed through the filters and is drained through a central tube which extends through the filter discs. For enabling a cleaning of the filters the filter disc and the central draining tube are mounted rotatable, and when cleaning the apparatus the discs are rotated and the filter cake is thrown out from the filter discs by the centrifugal force. The apparatus has a rather poor filtering volume, it gives a large rest volume of non-filtratable liquid, it is a rather complicated and time consuming work to exchange the filter elements, and depending on the rotatable filter discs and the collection tube there are sealing problems, problems in providing the centrifugation motor, bearings etc. (type FUNDA).

Conventional so called filter presses which comprise a large number of plate filters which are mounted together and pressed to seal against each other are disadvantageous in containing several different parts, there may be leakage between the compressed filter plates, it is a time consuming and complicated work to clean the filter elements by scraping the filter cakes away from the filter surfaces, and this conventional type of filter press occupies a large floor area.

The object of the invention therefore is to solve the problem of providing a filter, especially a filter apparatus which is useful for clear-filtering liquids which are difficult to filter, which gives a high degree of cleaning, which has a high filtering capacity, which allows long operation periods and a simple and quick cleaning of the filter elements, which gives a little rest volume of non-filtered liquid, which can quickly, simply and to a low cost be reconditioned by exchange of filter cloth, and which occupies a little volume, especially a little floor area.

By "liquids which are difficult to filter" is meant in this connection liquids containing particles which easily cake together and clog the filter element, or liquids containing very small particles which tend to penetrate the filter cloth, or liquids containing colloidal particles, viscous particles or slimy particles. The invention has especially been developed in connection to clear-filtering of milk sugar solutions containing rest volumes of proteins. Such rest proteins have a consistency which provides problems in connection to clear-filtering.

For filtering difficult to filter products the filter elements generally are covered with a so called filter aid substance and in some cases the liquids are mixed with a filtering assisting substance. This indeed may facilitate the filtering, but for difficult to filter products the degree of cleaning and the filtering capacity is reduced, and in many cases there are unacceptable short running periods until the filter elements have to be cleaned or reconditioned.

The filter according to the invention is mainly characterized in that the filtering unit comprises one or more filter elements which are mounted substantially concentrically inside the filter container, and that the filter container is formed with a bottom which can easily be opened, and that the filter element or elements are axially displaceable so that they may quickly and easily be pushed out of the container for being cleaned or for exchange of filter cloth etc. Preferably the filter unit comprises several cylindrical filter elements which are mounted concentrically inside each other, and in which the inner central filter element is adapted to carry one or more of the outer filter elements, and in which the filter elements are sealed from each other. The extraction and the contraction respectively of the filter elements may be accomplished by a hydraulically or pneumatically operating axial motor which is mounted in a sealed portion of the filter container. Each filter element may be a double walled cylinder in which at least the outer wall is formed with a filtering surface and in which there are means, for instance tubes of similar devices for draining the filtrate from the filtering apparatus and for moving the filtrate to a storing container or similar apparatus.

Further characteristics of the invention will be evident from the following detailed description in which reference will be made to the accompanying drawings.

In the drawings:

FIG. 2 is a cross section in a larger and more detailed scale of a portion of the filter of FIG. 1.

FIG. 3 is a fragmentary view of a detail of a filtering element in the apparatus according to the invention.

FIG. 4 is a view, partially in a longitudinal cross section, of an apparatus of the invention with the filter unit extracted from the filter container, and FIG. 5 shows a detail of the filter according to the invention as seen from underneath.

Figure 1:
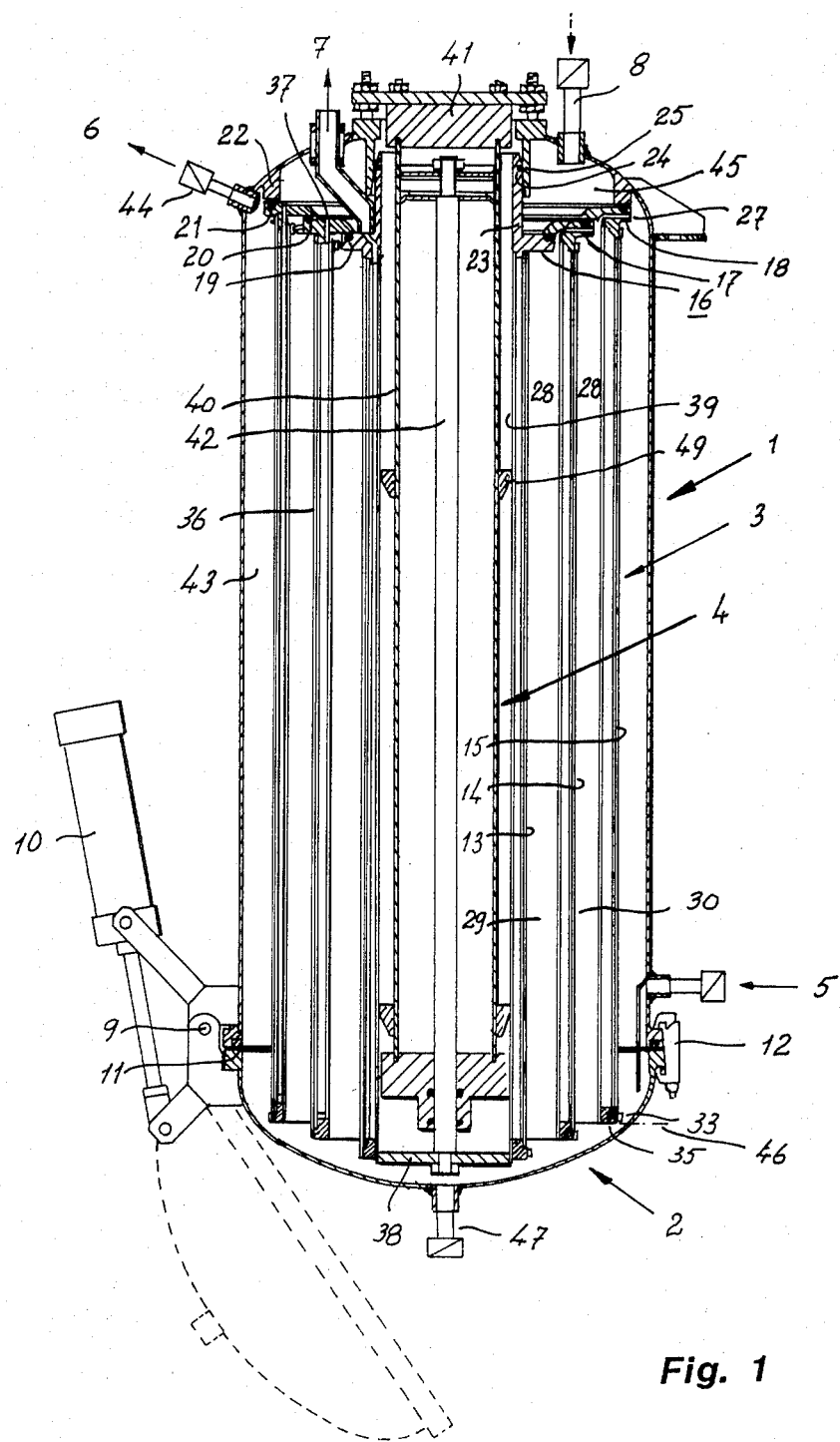
FIG. 1 is an axial cross section through an embodiment of a filter according to the invention.

The filter shown in the drawings generally comprises a cylindrical filter container 1 of pressure container type which at the bottom has a cover 2 which can be opened and which encloses a filter unit 3 and means 4 for mechanical handling of the filter unit 3.

In the illustrated case the filter is cylindrical and placed with the cylinder axis in the vertical position. It is obvious to the expert that the filter may have any other cross section form and that the filter may optionally be placed standing or lying down.

At the bottom the filter container 1 has an inlet 5 for the liquid to be filtered, and adjacent the top the filter container has an air outlet 6 and an outlet 7 for the filtrate and an inlet 8 for pressurized air by means of which the filter element can be cleaned from the accumulated filter cake. The bottom cover 2 is rotatable about a pin 9 actuated by a hydraulical or pneumatical cylinder 10, and the cover is adapted to be secured and clamped to sealings 11 by means of cramps 12 or similar means or by means of any automatic device of previously known type.

In the illustrated case the filter unit 3 comprises three filter elements 13, 14, 15 each in the form of a hanging cylinder having an upper filter collar 16, 17 and 18. As best evident from FIG. 2 the filter elements 13-15 are mounted inside each other by means of their collars 16-18, so that each filter element as seen from the center carries the adjacent outer filter element or elements. As evident the collar 16 of the innermost filter element 13 carries the intermediate filter element 14 by means of its collar 17, and the collar 17 of the intermediate filter element 14 in turn carries the outer filter element 15 by means of the collar 18. Between the collars 16, 17 and 18 there are sealings 19 and 20, and the collar 18 of the outer filter element 15 is contacting an annular shoulder 22 of the filter container over a sealing 21. The collar 16 of the inner filter element 13 has a projecting throat 23 which over a sealing 24 sealingly engages a corresponding downwards extending throat 25 of the filter container. Preferably the throats 23 and 25 are bevelled for facilitating the guiding of the inner element to the filter container. For guiding of one filter element in relation to the other the collars 16 and 17 may be formed with several bolts 26 distributed round the filter element and which over spacer sleeves can be adjusted to a suitable distance so that the filter elements 13, 14 and 15 are maintained on exactly mutual distances. In this connection it may be noted that the distance between the filter elements 13, 14 and 15 is determined by the maximum thickness of the accumulated filter cake, and it is obvious that the distance may be increased or reduced depending on what product should be filtered, what operation period is wanted etc.

As shown in FIG. 1 the collars of the filter elements are formed with radial passageways 27 the main object of which is to enable a draining of air which has been collected in the spaces 28 between the filter elements.

The construction of the filter elements is best evident from FIG. 3. Each filter element comprises a supporting inner cylindrical jacket 29 against which an outer removable and perforated jacket 30 in mounted. A wire net 31 is attached to the outer jacket 30 for facilitating the flow of liquid to the perforation holes of the outer jacket 30. Over the wire net 31 a filter cloth 32 is mounted. The filter cloth preferably is supplied in continuous lenghts is clamp connected at the upper and lower edge by means of clamps 33 and is connected in the axial direction to a simple overlap joint 34 (FIG. 4) by means of a clamp bar. At the bottom the filter element is sealed by means of a ring 35. For draining the filtered liquid each filter support collar 16, 17, 18 is formed with a number of downwards projecting tubes 36 which at the bottom leave a space for inlet of filtered liquid and which at the top are sealingly pressed to a shoulder of a vertical bore 37 of the collar. The vertical bore 37 opens into an upper collection chamber 45 which is defined between the top of the filter container on one hand and the collars 16-18 of the filter elements on the other hand.

The innermost element 13, 16 is sealed at the bottom by means of a bottom disc 38 and thereby the filter is formed as an inner sealed cylinder 39. In this inner cylinder 39 a hydraulic or pneumatic operation motor 40 is mounted with the cylinder part thereof hanging in a carrier 41 at the top of the filter container 1 and with the piston rod 42 mounted in the bottom disc 38 of the inner filter element. An extension of the motor 40 causes an extraction of the inner filter element 13 and therewith those outer filter elements 14, 15 which are carried by the inner filter element, and a contraction of the motor 40 causes a corresponding retraction of all filter elements into the filter cylinder and a mutual sealing of the filter elements.

Between the filter elements 13-15 and the filter container 1 and between the separate filter elements themselves there is a space 43 into which the liquid to be filtered is fed from inlet 5. For draining air when filling the apparatus with the liquid to be filtered there is an air outlet 6 including a valve 44 at the top. For draining the filtered liquid which is feed through the draining tubes 36 in the filter elements to the upper collection chamber 45, the filtrate outlet 7 is connected to the said collection chamber.

The function of the filter is the following:

The liquid to be filtered is pumped under pressure into the filter container 1 through the inlet 5, and the air volume which is thereby replaced is drained through the air outlet 6. The liquid to be filtered is forced under pressure through the filter cloth 32, the wire net 31 and the perforated outer jacket 30 and is thereafter forced up through the draining tubes 36 into the collection chamber 45, and from the collection chamber the filtrate is removed through the filtrate outlet 7. By utilizing pressurized air the filtering can be carried through to such an extent that the volume of the liquid chamber or space 43 practically drops to a level 46 at the bottom of the filter element and consequently a very little volume of liquid is remained, which liquid is drained through a bottom outlet 47.

Since the filter elements 13–15 have a large surface the filtering can be made for very long operation periods. In order to improve the filtering result the filter cloth is preferably provided with a precoating of a filtering aid substance, and a filtering aid substance further can be added to the liquid to be filtered.

The cleaning of the filter is made as follows:

The supply of liquid to be filtered is cut off and the liquid is replaced by means of air which is introduced through the valve 44. The liquid level in the space 43 thereby drops, and by that time the level is so low that air may enter the tubes 36. The last little remainder of nonfiltered product is drained through the bottom outlet 47 before a blow drying of the accumulated filter cakes starts. Free liquid accompanies the air, and in order to obtain a better leaching of the filter cake water steam may be admixed to the air. When the filter cake is considered sufficiently dried the bottom cover 2 is opened and the filter cakes are removed in that blows of pressurized air are introduced by intermittently opening the valve of the inlet 8. Thereby the air passes in a counter current direction through the tubes 36 to the inner side of the filter elements. For inspection, more thorough cleaning or exchange of filter cloth etc. all filter elements together or the filter elements one by one can be lowered from the filter container. This is made in that the cramps 12 are removed and the bottom cover 2 is rotated out as shown with the dotted lines in FIG. 1. When the piston rod 42 of the motor is expelled the filters which are carried by the motor are lowered to any wanted level underneath the filter container.

For lowering the filters one by one a simple holder means is used which is illustrated in FIGS. 4 and 5. The holder means comprises a pair of rotatable clamps 48 which can be adjusted so as to hold the intermediate filter 14 and together with said intermediate filter 14 also the outer filter 15 (full lines in FIG. 5) or so as to hold only the outer filter 15 to allow a moving downwards of the inner filters 13 and 14 (dotted lined in FIG. 5). The clamps of course also can be moved out so that all three filters can be let down. In FIG. 4 only the inner filter 13 has been let down. When retracting the piston rod 42 all filters are retracted to their inner and sealed position in the filter container.

For stabilizing the inner filter 13 on the motor 40 said motor at the exterior side can be formed with guide blocks 49 and similarly guide blocks may be provided between the filter elements themselves.

Figure 6:
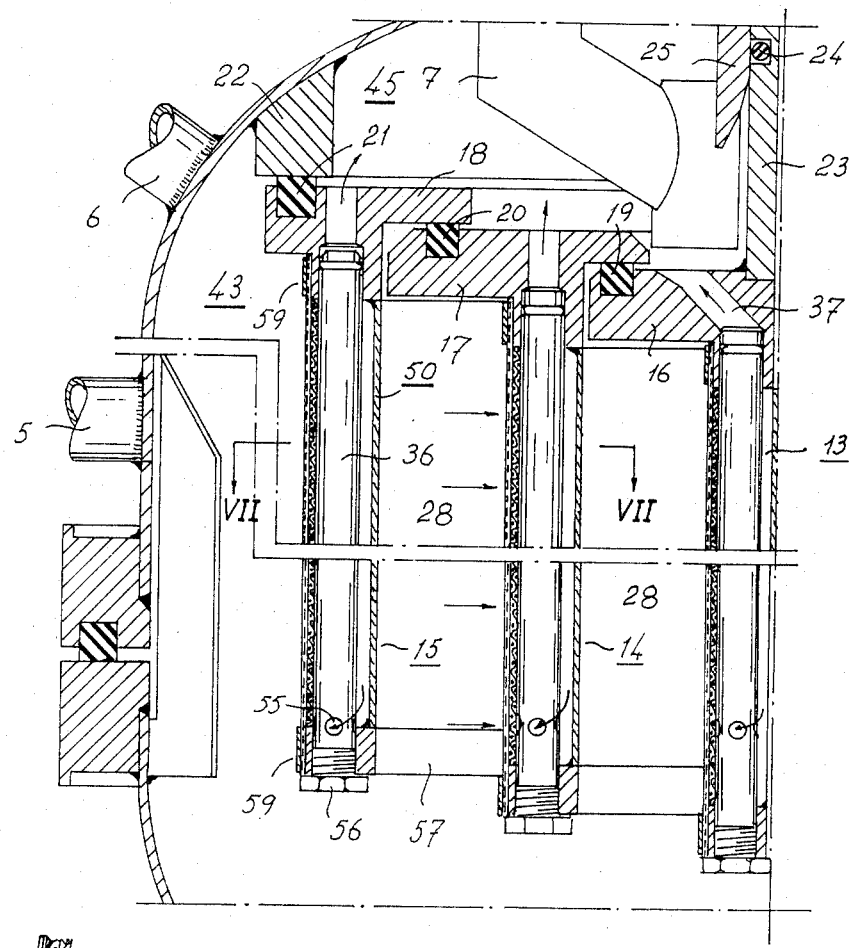
FIG. 6 is an axial cross section through a modified embodiment of the invention.
Figure 7:
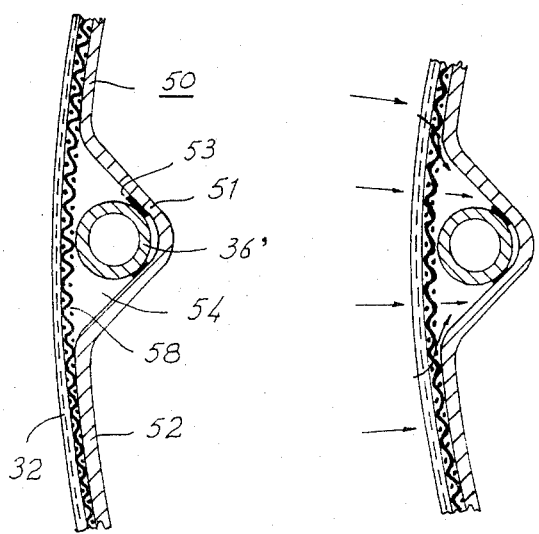
FIG. 7 is a cross section view in larger scale of the detail shown in FIG. 6.

In the embodiment according to FIGS. 6 and 7 the inner jacket and outer jacket of each filter element are combined to one single jacket 50 having a number of indentations 51 at each position where the inner tubes 36' are provided. The main surface 52 of the jacket 50 is cylindrical and is positioned on a circle corresponding to the outer jacket 30 of the previously described embodiment. The indentations 51 are substantially of V-section and in each indentation the draining tube 36 is mounted over spacer elements 53. Between the draining tube 36' and the exterior side of the indentation there is provided a collection chamber 54 for receiving the filtered liquid which enters the tube 36' through a number of bores 55 provided at the lower end of the tube. The tubes are kept in a sealed engagement with the collars 16–18 by means of screws 56 threaded into a bottom plate 57 at each indentation 51 and tube 36'.

Over the main surface 52 of the jacket 50 and across each collection chamber 54 a wire net 58 is mounted and over the wire net the filter cloth is mounted by means of clamp strips 59.

In the last mentioned embodiment there is no need for having a double-jacket filter element, and the filter elements are more easy to inspect, maintain and repair upon need. The liquid entering through the inlet 6 is pressed through the filter cloth 32 and through the wire net 58 and enters the collection chamber 54 in which the filtered liquid flows down and enters the draining tubes 36' through the bores 55. It should be noted that the filtered liquid easily follows the outer main surface 32 passing through the spaces in the wire net 58 and that the filtering capacity is at least as high as in the previously described embodiment.

It is to be understood that the embodiments of the invention described above and illustrated in the accompanying drawings are only examples and that all kinds of different modifications may be presented within the scope of the appended claims.

I claim:

1. A filter assembly particularly adapted for use with liquids which are difficult to filter, said filter assembly comprising a cylindrical filter container including an inlet for the liquid to be filtered and an outlet for a filtrate, and a filter unit contained within said container, said filter unit comprising a plurality of separate filter elements formed as individual units which are mounted substantially concentrically within said filter container, and which are axially displaceable with respect to said filter container, each said filter element comprising an inner jacket and outer jacket, and at least the inner jacket being perforated and supporting a filter means, a filtrate chamber being provided between said jackets and at least one drain tube extending into said filtrate chamber for enabling draining of the filtrate therefrom, said filter assembly further including a means defining a simple opening for exposing each separate filter element for inspection and cleaning without disassembling the filter assembly.

2. A filter assembly according to claim 1 wherein the means defining a simple opening includes a cover which can be opened, and wherein the filter elements can be extracted from the filter container through the open cover and can be retracted into the filter container, said inlet and outlet being located at the other end of said container.

3. A filter assembly according to claim 1 wherein the innermost element is sealed at the bottom thereof and supports the other filter elements in sealed engagement with each other, said filter elements including a radial collar and the collar of each filter element serving to support the adjacent filter element disposed outwardly thereof by means of the associated collar.

4. A filter assembly according to claim 1 further comprising an axially operating motor for extracting and retracting the filter elements.

5. A filter assembly according to claim 1 further comprising a collection chamber which is connected by passageways to said at least one drain tube for collecting the filtrate from the drain tube and which is connected to the filtrate outlet so that the filtrate can be extracted from the filter assembly.

6. A filter assembly according to claim 1 wherein filter assembly includes means for removing air from a filtrate chamber for non-filtered liquid, and means for removing any filter cake which may have been accumulated on the surfaces of the filter elements.

7. A filter assembly particularly adapted for use with liquids which are difficult to filter, said filter assembly comprising a cylindrical filter container including an inlet for the liquid to be filtered in an outlet for a filtrate, and a filter unit comprising a plurality of concentrically mounted filter elements disposed substantially concentrically within said filter container, each said filter element comprising a single cylindrical jacket having at least one indentation therein, at least one draining tube being disposed in the indentation for removing filter liquid, and a wire net and a filter cloth being mounted around the single jacket and across the indentation and the draining tube provided therein, the indentation being formed so as to provide a collection chamber between the draining tube and the wire net and filter cloth and the filtered liquid flowing down and being received through bores adjacent to the bottom of the draining tube.

* * * * *